US012717370B2

(12) United States Patent
Seino et al.

(10) Patent No.: US 12,717,370 B2
(45) Date of Patent: Aug. 25, 2026

(54) CONTROL DEVICE HAVING CONTROL MEMBER RETURNABLE TO NEUTRAL POSITION

(71) Applicant: Alps Alpine Co., Ltd., Tokyo (JP)

(72) Inventors: Fumitaka Seino, Miyagi-ken (JP); Masatoshi Ono, Miyagi-ken (JP); Toru Nishioka, Tokyo (JP)

(73) Assignee: Alps Alpine Co., Ltd. (JP)

( * ) Notice: Subject to any disclaimer, the term of this patent is extended or adjusted under 35 U.S.C. 154(b) by 0 days.

(21) Appl. No.: 18/910,052

(22) Filed: Oct. 9, 2024

(65) Prior Publication Data

US 2025/0028348 A1 Jan. 23, 2025

Related U.S. Application Data

(63) Continuation of application No. PCT/JP2023/007411, filed on Feb. 28, 2023.

(30) Foreign Application Priority Data

Apr. 21, 2022 (JP) ................................ 2022-069990

(51) Int. Cl.
*G05G 9/047* (2006.01)
*G05G 5/05* (2006.01)

(52) U.S. Cl.
CPC ............... *G05G 9/047* (2013.01); *G05G 5/05* (2013.01); *G05G 2009/04718* (2013.01); *G05G 2009/04766* (2013.01)

(58) Field of Classification Search
CPC .......... G05G 2009/04714; G05G 2009/04718; G05G 2009/04722; G05G 2009/04725;
(Continued)

(56) References Cited

U.S. PATENT DOCUMENTS 6,078,247 A 6/2000 Shimomura
2009/0295724 A1* 12/2009 Cheng .................... G05G 9/047 345/161

(Continued)

FOREIGN PATENT DOCUMENTS

JP H10-283885 * 10/1998
JP H11-053995 A 2/1999
JP 2000-123690 A 4/2000

*Primary Examiner* — Minnah L Seoh
*Assistant Examiner* — Gregory T Prather
(74) *Attorney, Agent, or Firm* — Harness, Dickey & Pierce, P.L.C.

(57) ABSTRACT

A control device includes a housing, a control member including a shaft portion to be tilted to turn about a first turn axis intersecting a direction the shaft portion extends, a first interlock member including a first shaft support portion supported by the housing turnably about the first turn axis to be turned in conjunction with a tilting operation on the control member, a return member to apply a return force to return the control member to a neutral position to the control member, an urging member to apply the return force via the return member to the control member, and a first turn detection section to detect a turn of the first interlock member. The return member includes a bottom portion and a receiving portion, and the urging member applies the return force to the control member while causing the receiving portion to elastically engage the housing.

8 Claims, 11 Drawing Sheets

(58) Field of Classification Search
CPC ......... G05G 2009/04766; G05G 9/047; G05G 5/04; G05G 5/05
See application file for complete search history.

(56) References Cited

U.S. PATENT DOCUMENTS

2021/0236919 A1* 8/2021 Endo ...................... H01H 25/04
2023/0103383 A1* 4/2023 Lai ........................ G06T 19/006
345/161

* cited by examiner

CONTROL DEVICE HAVING CONTROL MEMBER RETURNABLE TO NEUTRAL POSITION

CLAIM OF PRIORITY

This application is a Continuation of International Application No. PCT/JP2023/007411 filed on Feb. 28, 2023, which claims benefit of Japanese Patent Application No. 2022-069990 filed on Apr. 21, 2022. The entire contents of each application noted above are hereby incorporated by reference.

BACKGROUND OF THE INVENTION

1. Field of the Invention

The present invention relates to a control device having a control member configured to be tilted in a desired direction for input.

2. Description of the Related Art

As an example of control devices having a control member such as a control lever configured to be tilted for input, Japanese Unexamined Patent Application Publication No. 11-053995 discloses a multi-directional input device. The multi-direction input device includes a first interlock member having an elongated slot and being configured to be turnable, a second interlock member having an elongated slot and being configured to be turnable, the second interlock member disposed in a direction orthogonal to the first interlock member, a frame, the interior of which is bridged by the first interlock member and the second interlock member, a control shaft inserted through the elongated slot of the first interlock member, pivotably supported by the second interlock member, and tiltable with the shaft support portion as a point of support, and a plurality of electric parts driven via the first and second interlock members in response to an operation of the control shaft. The control shaft is made of a plate material and its cross-section has a substantially rectangular shape. This multi-directional input device includes a dish-shaped return member larger than the control member and the return member is disposed below the control member. In addition, a lower frame member having a cylindrical holding wall for holding the return member so as to be vertically movable is provided. A compressed return spring is provided between the return member and the lower frame member to elastically urge the return member upward.

Japanese Unexamined Patent Application Publication No. 2000-123690 discloses a multifunctional complex switch having good operability and that can provide a small switch. This complex switch includes a multi-directional switch means that sends a predetermined control signal corresponding to a tilt direction and a tilt angle in response to a tilting operation of a control section and stops the control signal when the control section returns to an initial position, and a button switch means that is disposed around the multi-directional switch and on a moving path of the control section made when the control section is tilted and is configured to open and close in response to a pushing operation and a push releasing operation performed when the control section is tilted.

Some of such control devices may include a return member for returning a tilted control member to a neutral position as in Japanese Unexamined Patent Application Publication No. 11-053995. An return force is applied from an urging member via the return member to the control member. When the control member is tilted, the urging member is pushed by the return member and when the tilting of the control member is released, the urging force of the urging member is applied via the return member to the control member. The return member slides in one direction with respect to a housing in response to a tilting operation and a tilt releasing operation.

If the return member rattles while sliding, the position of the return member may vary while the control member is returning to the neutral position, and this may prevent the return member from sliding. Furthermore, if the sliding movement of the return member is unstable, the return movement of the control member to the neutral position may vary.

The present invention has been made in view of the above-described problems, and is directed to provide a control device that enables stable sliding movement of a return member to suppress the occurrence of variations in returning movement when a control member returns to a neutral position.

SUMMARY OF THE INVENTION

According to an aspect of the present invention, there is provided a control device that includes a housing, a control member including a shaft portion extending in a direction, the control member being configured to be tilted to turn about a first turn axis intersecting the direction in which the shaft portion extends, a first interlock member including a first shaft support portion supported by the housing turnably about the first turn axis, the first interlock member being configured to be turned in conjunction with a tilting operation on the control member, a return member configured to apply a return force to return the control member to a neutral position to the control member, an urging member configured to apply the return force via the return member to the control member, and a first turn detection section configured to detect a turn of the first interlock member. The return member includes a bottom portion in contact with an end portion of the control member in the extending direction, and a receiving portion provided around the bottom portion, the receiving portion receiving an end of the urging member, and the urging member applies the return force to the control member while causing a plurality of engaging portions provided on an outer peripheral side of the receiving portion to elastically engage the housing.

With such a structure, the engaging portions elastically engage the housing when the urging member applies a return force to the control member. By the elastic engagement, the tilt return force applied to the return member can be reduced, and the control member can accurately return to the neutral position.

In the control device, at least one of an engagement receiving portion configured to engage the engaging portion in the housing and the engaging portion may have a surface inclined with respect to the urging direction of the urging member. With this structure, when the engaging portion elastically engages the housing, the contact position of the engaging portion and the engagement receiving portion moves in the urging direction depending on the engagement pushing force, and thereby the return member inclined with respect to the urging direction can return more readily in a direction along the urging direction.

In this control device, the housing may have an elastic deformation portion to cause the engaging portion to elastically engage the housing, or the return member may have an elastic deformation portion to cause the engaging portion to elastically engage the housing. With this structure, such an elastic deformation portion can ensure elastic engagement of the engaging portion with the housing.

In this control device, the elastic deformation portion may have a piece member extending along the urging direction of the urging member, the engaging portion may be provided to an outer peripheral side of the piece member, and when the engaging portion engages the housing, the piece member may be bent and the engaging portion may move toward an inner peripheral side of the return member. With this structure, the engaging portion can move toward an inner peripheral side of the return member by an engagement-pushing force produced by the bending of the piece member, and thereby elastic engagement of the engaging portion with the housing can be ensured.

In this control device, when the control member in the neutral position is viewed in the extending direction, the engaging portions may be provided on the same circumference about the center of the bottom portion, and when the elastic engagement occurs, the engaging portions may move and the bottom portion may receive the force in one direction along the circumference. With this structure, the engagement-pushing forces generated in elastic engagement of the engaging portions are directed to become a force for turning the bottom portion in the in-plane direction as a whole, thereby gradually reducing the variations in the engagement-pushing forces due to the engaging portions and suppressing the occurrence of an offset of the bottom portion in the in-plane direction.

In the control device, the number of the engaging portions may be three or more. Three or more engaging portions enable generation of engagement-pushing force in at least three directions. Accordingly, the occurrence of an offset of the bottom portion of the return member in the in-plane direction can be suppressed.

In the control device, the control member and the first interlock member may be in contact with each other, and the first shaft support portion of the first interlock member may be pushed against the housing by the urging force of the urging member transmitted from the control member to the first interlock member. With this structure, play in the movement of the control member and the first interlock member can be suppressed from occurring.

In the control device, the first interlock member may be elastically bent by the urging force of the urging member. With the first interlock member that is elastically bent, it can be prevented that all urging force of the urging member is applied to the return member and an increase in resistance load in elastic engagement of the engaging portions with the housing can be suppressed.

The control device may further include a second interlock member including a second shaft support portion supported by the housing turnably about a second turn axis intersecting the first turn axis, the second interlock member being configured to be turned in conjunction with a tilting operation on the control member, and a second turn detection section configured to detect a turn of the second interlock member.

DESCRIPTION OF THE PREFERRED EMBODIMENTS

Figure 1:
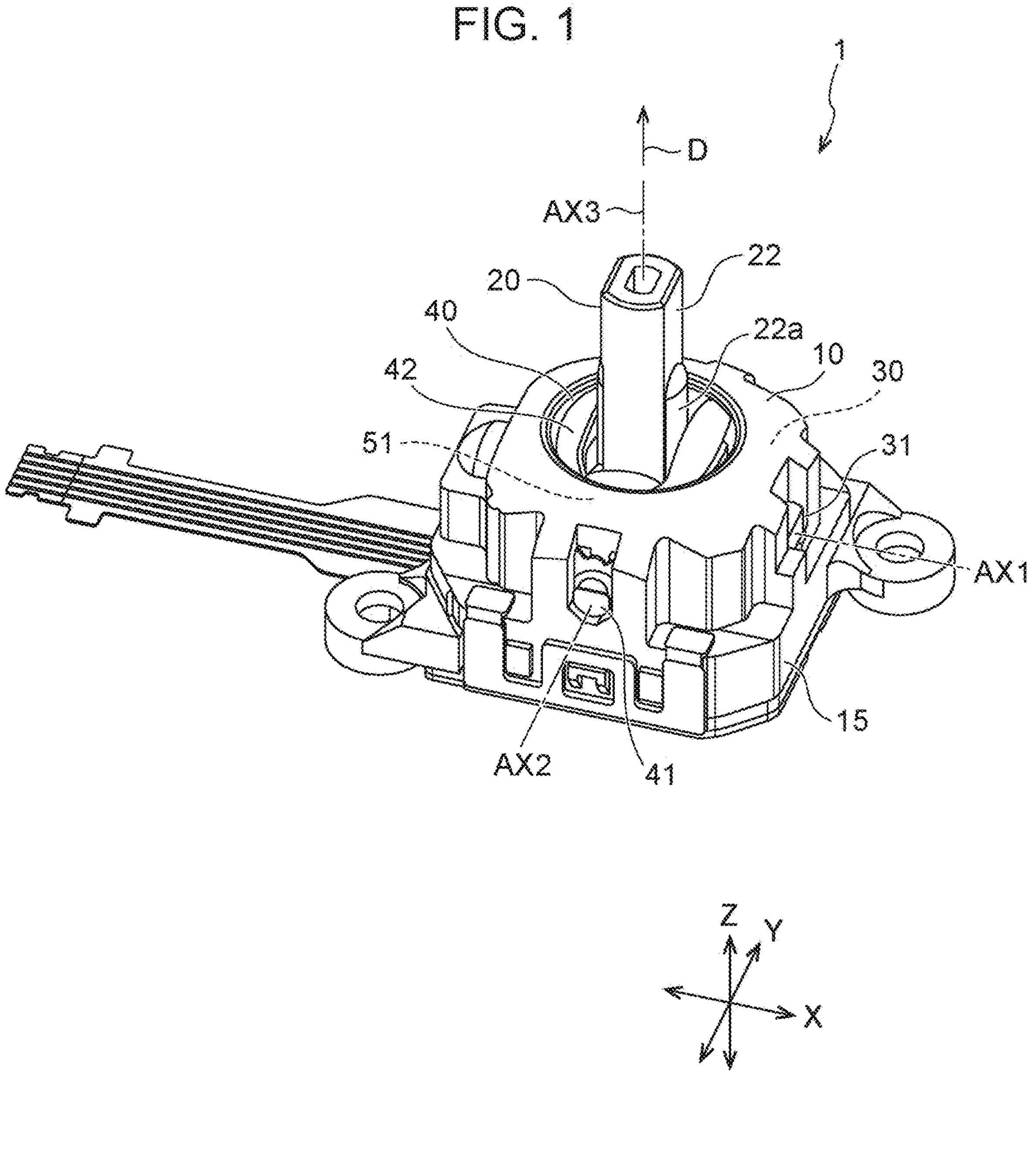
FIG. 1 is a perspective view illustrating a control device according to an embodiment.

Hereinafter, an embodiment of the invention will be described in detail with reference to the attached drawings. In the following descriptions, the same reference numerals are given to the same components and descriptions of the components described once will be omitted as appropriate.

Structure of Control Device

Figure 2:
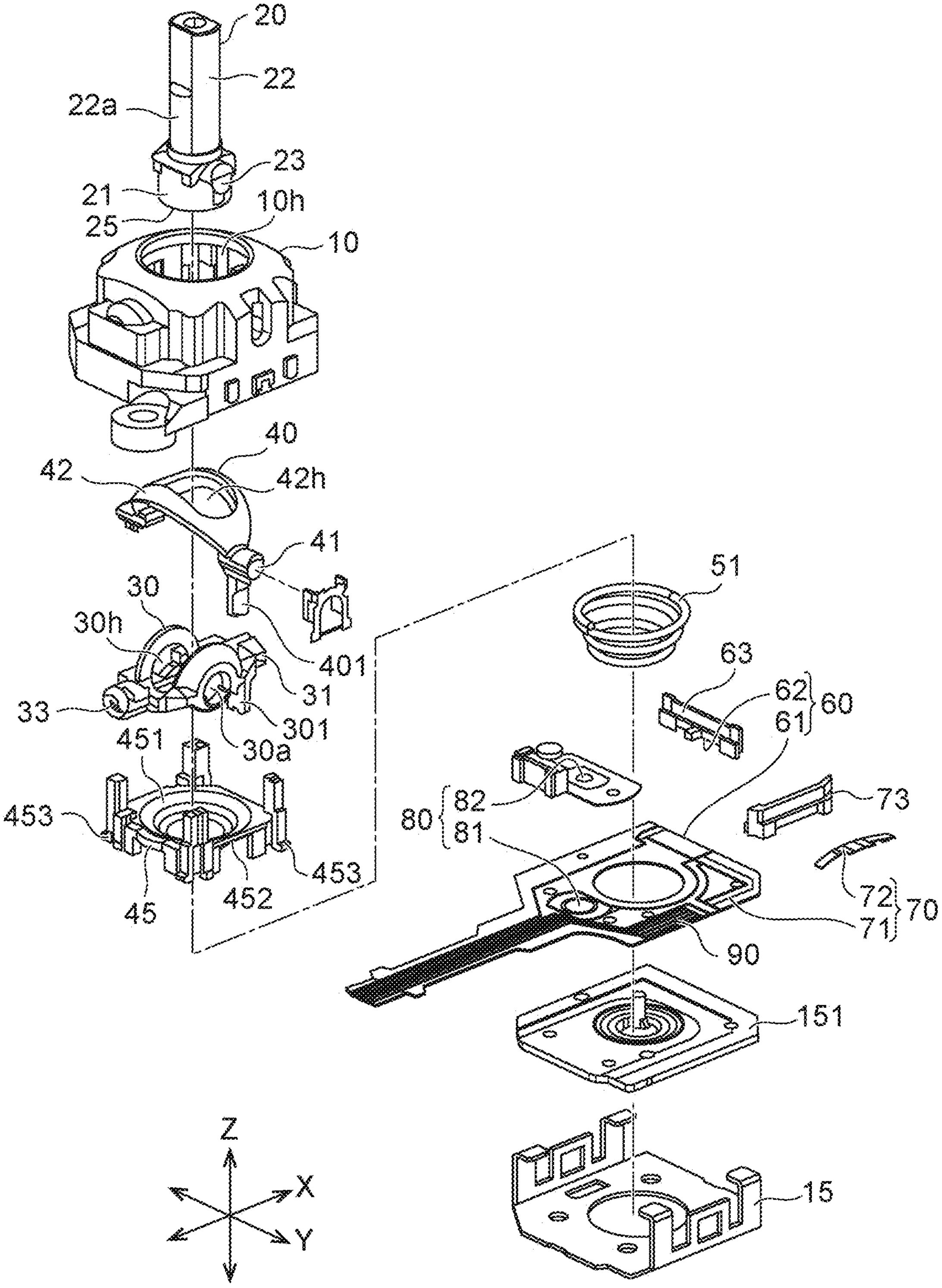
FIG. 2 is an exploded perspective view illustrating a structure of a control device according to an embodiment.

FIG. 1 is a perspective view illustrating a control device according to the embodiment. FIG. 2 is an exploded perspective view illustrating a structure of the control device according to the embodiment. A control device 1 according to the embodiment is a device configured to receive an input in response to an operation of tilting a control member 20 with respect to a housing 10. Among axes of turn in tilting the control member 20 in the description of the embodiment, it is defined that a first turn axis AX1 is parallel to the X-axis, a second turn axis AX2 is parallel to the Y-axis, and an axis (neutral axis AX3) at a neutral position of the control member 20 is parallel to the Z-axis. In the Z-axis direction, it is defined that a side toward which the control member 20 at the neutral position extends is referred to as an upper side in the Z-axis direction (up, upward), and the opposite side is referred to as a lower side in the Z-axis direction (down, downward).

The control device 1 includes the housing 10, the control member 20, a first interlock member 30, a second interlock member 40, an urging member 51, a first turn detection section 60, and a second turn detection section 70. The housing 10 has a substantially box shape and has an opening at a lower portion. A hole 10*h* for positioning the control member 20 is provided at an upper central portion of the housing 10. A bottom plate member 15 is provided as a part of the housing 10 at the lower opening portion of the housing 10. The housing 10 may contain, as a non-limiting example, a resin-based material, for example, polyester such as polybutylene terephthalate, or polyamide, or a metallic material such as an iron-based material, an aluminum-based material, or a copper-based material. The bottom plate member 15 may contain the same material as the material contained in the housing 10, or may contain a different material. As a specific example case in which the housing 10 and the bottom plate member 15 contain different materials, the housing 10 may contain a resin-based material, and the bottom plate member 15 may contain a metallic material.

The control member 20 includes a cylindrical portion 21 disposed in the housing 10 and a shaft portion 22 that extends outward from the inner side of the housing 10 through the hole 10*h*. When the control member 20 is at the neutral position, the extending direction D of the shaft portion 22 is parallel to the Z-axis, whereas, when the control member 20 is tilted, the extending direction D of the shaft portion 22 is not parallel to the Z-axis. The control member 20 can be tilted about each of the first turn axis AX1 and the second turn axis AX2 with respect to the housing 10.

The first interlock member 30 has a first shaft support portion 31 that is supported by the housing 10 turnably about the first turn axis AX1 and is turned in conjunction with a tilting operation on the control member 20. The first interlock member 30 has a frame shape and has a hole 30*h* at a center. The control member 20 is inserted through the center hole 30*h* of the first interlock member 30. A fit protruding portion 23 protrudes from the cylindrical portion 21 of the control member 20. The fit protruding portion 23 slidably fits into a fitting hole 30*a* provided in the first interlock member 30. The first interlock member 30 may contain, as a non-limiting example, a resin-based material such as polyacetal, polyester, or polyamide.

The second interlock member 40 has a second shaft support portion 41 that is supported by the housing 10 turnably about the second turn axis AX2 and is turned in conjunction with a tilting operation on the control member 20. The second interlock member 40 has an arched arch portion 42. A hole 42*h* is provided at a center of the arch portion 42 of the second interlock member 40. The shaft portion 22 of the control member 20 is inserted through the center hole 42*h* of the arch portion 42 of the second interlock member 40. The shaft portion 22 of the control member 20 has a convex portion 22*a*. The convex portion 22*a* comes into contact with the arch portion 42 in a state in which the control member 20 is inserted through the hole 42*h* of the arch portion 42 such that the shaft portion 22 slidably fits into the hole 42*h*.

The second interlock member 40 is disposed to cover the first interlock member 30 in the Y-axis direction. In a state in which the second interlock member 40 covers the first interlock member 30 and the shaft portion 22 of the control member 20 is inserted through the hole 30*h* of the first interlock member 30 and the hole 42*h* of the second interlock member 40, these components are incorporated into the housing 10. The second interlock member 40 may contain, as a non-limiting example, a resin-based material such as polyacetal, polyester, or polyamide.

The urging member 51 urges the control member 20 to push the first shaft support portion 31 of the first interlock member 30 against the housing 10 and provide a return force for returning the control member 20 to the neutral position to the control member 20. The urging member 51 is, for example, a coil spring. The urging member 51 urges the control member 20 via a return member 45.

The return member 45 is disposed below the control member 20 (closer to the bottom plate member 15 side than the first interlock member 30 is) and is pushed downward in conjunction with a tilting of the control member 20. The urging member 51 is incorporated between the return member 45 and a receiving bottom section 151 that is in contact with the bottom plate member 15.

The return member 45 includes a bottom portion 451 that is in contact with a first end portion 25 that is an end portion (lower end) of the control member 20 in the extending direction and a receiving portion 452 that is disposed around the bottom portion 451 and receives an end of the urging member 51. More specifically, one end (upper end) of the urging member 51 is received by the receiving portion 452 and the other end (lower end) is received by the receiving bottom section 151. With this structure, the urging member 51 urges upward the control member 20 via the return member 45.

The receiving portion 452 has a plurality of engaging portions 453 on an outer peripheral side. The engaging portions 453 engage the housing 10. With this structure, the return member 45 serves as a guide for the housing 10 in sliding in the up-down direction. In this embodiment, the engaging portions 453 are configured to elastically engage the housing 10. The engagement of the engaging portions 453 with the housing 10 will be described below.

The first turn detection section 60 detects a turn of the first interlock member 30, and the second turn detection section 70 detects a turn of the second interlock member 40. The first turn detection section 60 includes, for example, an electrical-resistance sensor 61 and a brush 62. The second turn detection section 70 includes, for example, an electrical-resistance sensor 71 and a brush 72. The electrical-resistance sensors 61 and 71 are formed on a circuit board 90 such as a flexible printed circuit board. The brushes 62 and 72 are attached to a holder 63 and a holder 73 respectively. The brushes 62 and 72 are mounted so as to slide together with the holders 63 and 73 on the electrical-resistance sensors 61 and 71 respectively.

The holder 63 with the brush 62 attached can be slid in conjunction with a swing of a claw portion 301 provided to the first interlock member 30. With this structure, the claw portion 301 is caused to swing by a turn of the first interlock member 30 about the first turn axis AX1 and the swing causes the holder 63 to slide on the electrical-resistance sensor 61. The electrical resistance values change depending on positions of the brush 62 on the electrical-resistance sensor 61, and by using the electrical resistance values, the turn of the first interlock member 30 about the first turn axis AX1 can be detected.

The holder 73 with the brush 72 attached can be slid in conjunction with a swing of a claw portion 401 provided to the second interlock member 40. With this structure, the claw portion 401 is caused to swing by a turn of the second interlock member 40 about the second turn axis AX2 and the swing causes the holder 73 to slide on the electrical-resistance sensor 71. The electrical resistance values change depending on positions of the brush 72 on the electrical-resistance sensor 71, and by using the electrical resistance values, the turn of the second interlock member 40 about the second turn axis AX2 can be detected.

A displacement detection section 80 is attached to the circuit board 90. The displacement detection section 80 includes, for example, a contact pattern 81 formed on the circuit board 90 and a contact sheet 82 disposed on the contact pattern 81. The displacement detection section 80 detects a displacement of the control member 20 in a direction different from both about the first turn axis AX1 and about the second turn axis AX2. In this embodiment, the displacement detection section 80 detects a displacement along the extending direction of the control member 20.

The first interlock member 30 has an arm portion 33 that extends from the side opposite to the side on which the first shaft support portion 31 is provided above the displacement detection section 80. For example, when the control member 20 is pushed (hereinafter, this operation of pushing is also referred to as a "pushing operation") in a direction opposite to the direction the control member 20 extends from the housing 10, the pivot is located on the first shaft support portion 31 side, and the pushing force causes the arm portion 33 of the first interlock member 30 to be pushed toward the displacement detection section 80 side. This displacement of the arm portion 33 pushes the contact sheet 82 to bring the contact sheet 82 and the contact pattern 81 to come into contact with each other, that is, the displacement detection section 80 is brought to a conducting state. Accordingly, the pushing operation on the control member 20 can be detected.

Tilting operation and Return Operation

Figure 3:
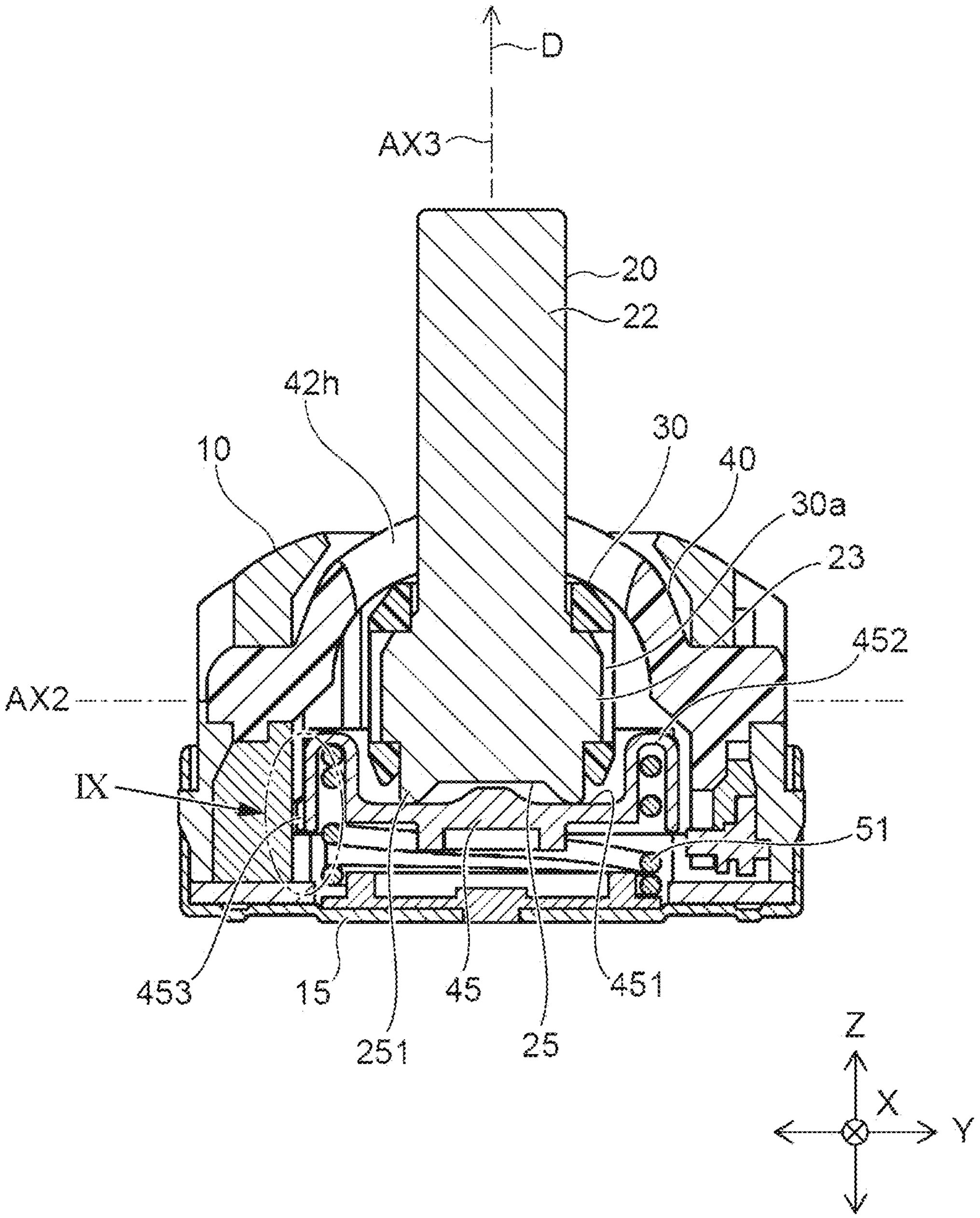
FIG. 3 is a cross-sectional view illustrating a control member in a neutral position.
Figure 4:
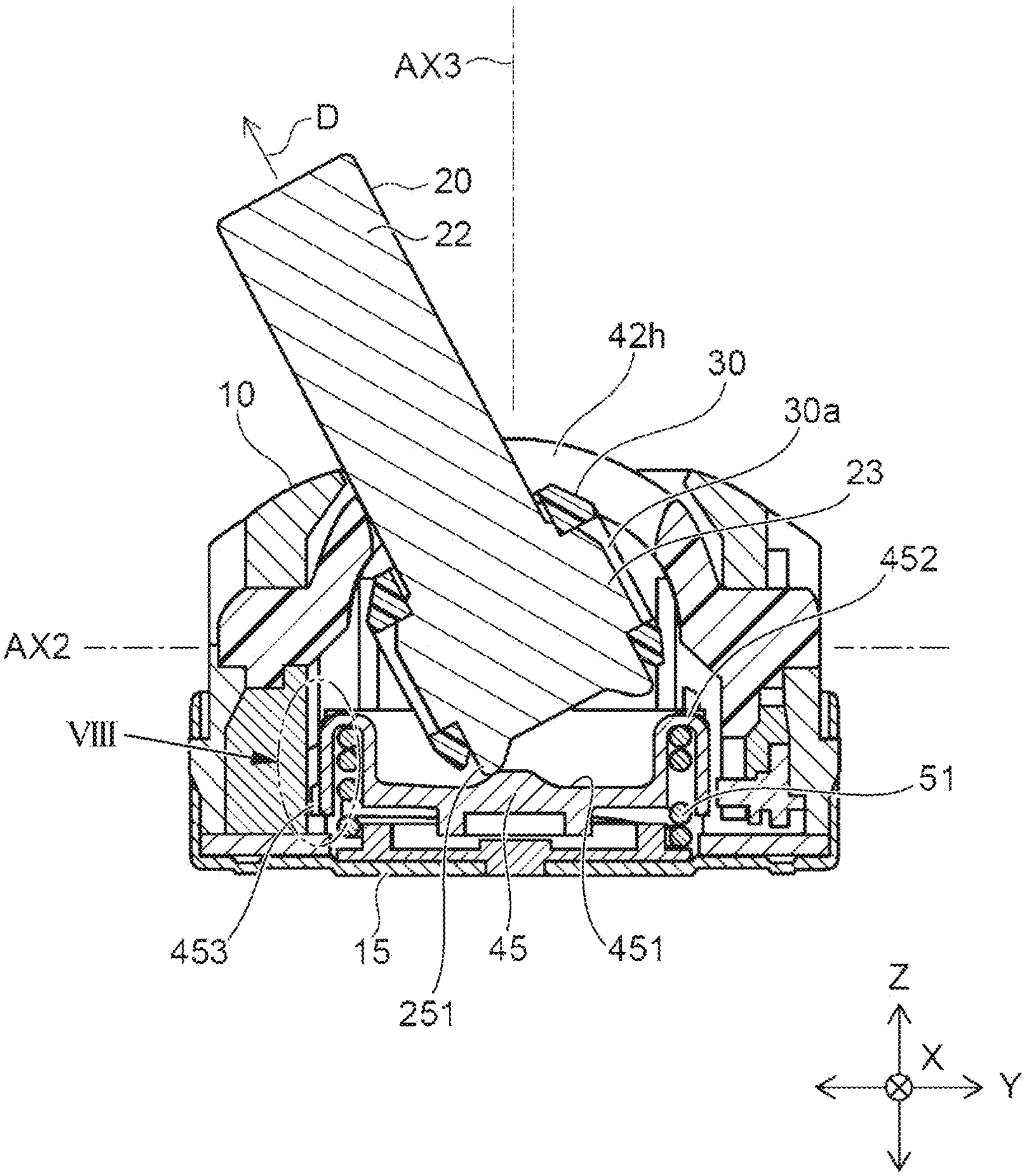
FIG. 4 is a cross-sectional view illustrating a control member in a tilted state.

FIG. 3 is a cross-sectional view illustrating the control member in a neutral position. FIG. 4 is a cross-sectional view illustrating the control member in a tilted state. FIG. 3 and FIG. 4 are cross-sectional views (cross sections on the YZ plane) viewed in the X direction. As illustrated in FIG. 3, when the control member 20 is in the neutral position, the return member 45 receives an urging force produced by the urging member 51 and is moved upward to a location.

The first end portion 25 of the control member 20 has a bottom contact portion 251 that is in contact with the bottom portion 451 of the return member 45. The bottom contact portion 251 protrudes toward the bottom portion 451 side more in the Z direction than the central portion of the first end portion 25. The bottom contact portion 251 has a cylindrical shape about the axis of the control member 20.

The central portion of the bottom portion 451 with which the bottom contact portion 251 is in contact protrudes more than the other portions. When the control member 20 is in the neutral position, the bottom contact portion 251 is in contact with the bottom portion 451 at a lowest position in the Z direction. The urging force produced by the urging member 51 is applied to the control member 20 via the return member 45. This urging force brings the bottom contact portion 251 to come into contact with the lowest position of the bottom portion 451 in the Z direction. Accordingly, the force to return to the neutral position is applied to the control member 20.

As illustrated in FIG. 4, when the control member 20 is tilted, the contact position of the bottom contact portion 251 on the tilted side at which the bottom contact portion 251 comes into contact with the bottom portion 451 moves toward the center side. Since the portion around the central portion of the bottom portion 451 protrudes more than the other portions, when the protruding portion comes into contact with the bottom contact portion 251, the return member 45 outweighs the urging force of the urging member 51 and is pushed downward. The return member 45 pushed downward compresses the urging member 51.

When the tilting operation on the control member 20 is released, the compressed urging member 51 expands to push the return member 45 upward. Accordingly, the contact position of the bottom contact portion 251 with the bottom portion 451 moves from the protruding portion around the central portion to a lower position outside the protruding portion. Then, the force to move the contact position of the bottom contact portion 251 to the lowest position of the bottom portion 451 in the Z direction works as a return force, causing the control member 20 to return to the neutral position.

In such tilting movement and return movement of the control member 20, the return member 45 moves in the up-down directions with respect to the housing 10. The movement of the return member 45 in the up-down directions is guided by the positional relationship between the housing 10 and the engaging portions 453.

Figure 5:
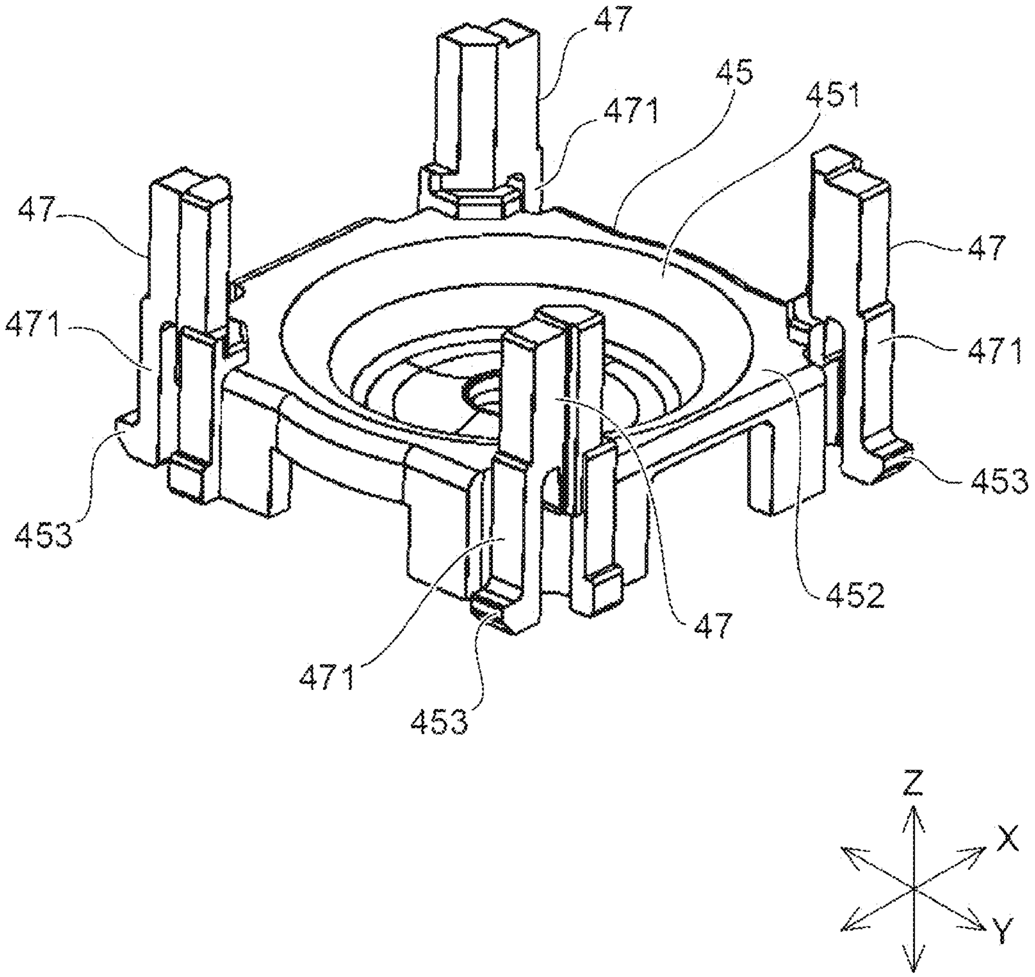
FIG. 5 is a perspective view illustrating a return member.

FIG. 5 is a perspective view illustrating the return member. The return member 45 receives the control member 20 on an upper side of the bottom portion 451 and receive the urging member 51 on a lower side of the receiving portion 452. An outer shape of the return member 45 viewed in the Z direction is substantially square, and the engaging portions 453 are provided to four corner portions.

Elastic deformation portions 47 are provided to the four corner portions of the return member 45. Each elastic deformation portion 47 has a piece member 471 extending in the Z direction, and the engaging portion 453 is provided to an outer peripheral side of the piece member. With this structure, when the engaging portions 453 engage the housing 10, the piece members 471 are bent and the engaging portions 453 move toward an inner peripheral side of the return member 45, thereby providing elastic engagement of the engaging portions 453 with the housing 10.

The elastic engagement of the four engaging portions 453 with the housing 10 enables the return member 45 to maintain balance in the up-down movement. It should be noted that the four engaging portions 453 are provided to the return member 45 in FIG. 5; however, three or more engaging portions 453 may be provided to the return member 45. Three or more engaging portions 453 enable generation of engagement-pushing force in at least three directions (directions along the plane orthogonal to the extending direction), reducing offsets of the bottom portion 451 of the return member 45 in the in-plane direction. Accordingly, the control member 20 can be returned accurately to the neutral position.

Figure 6:
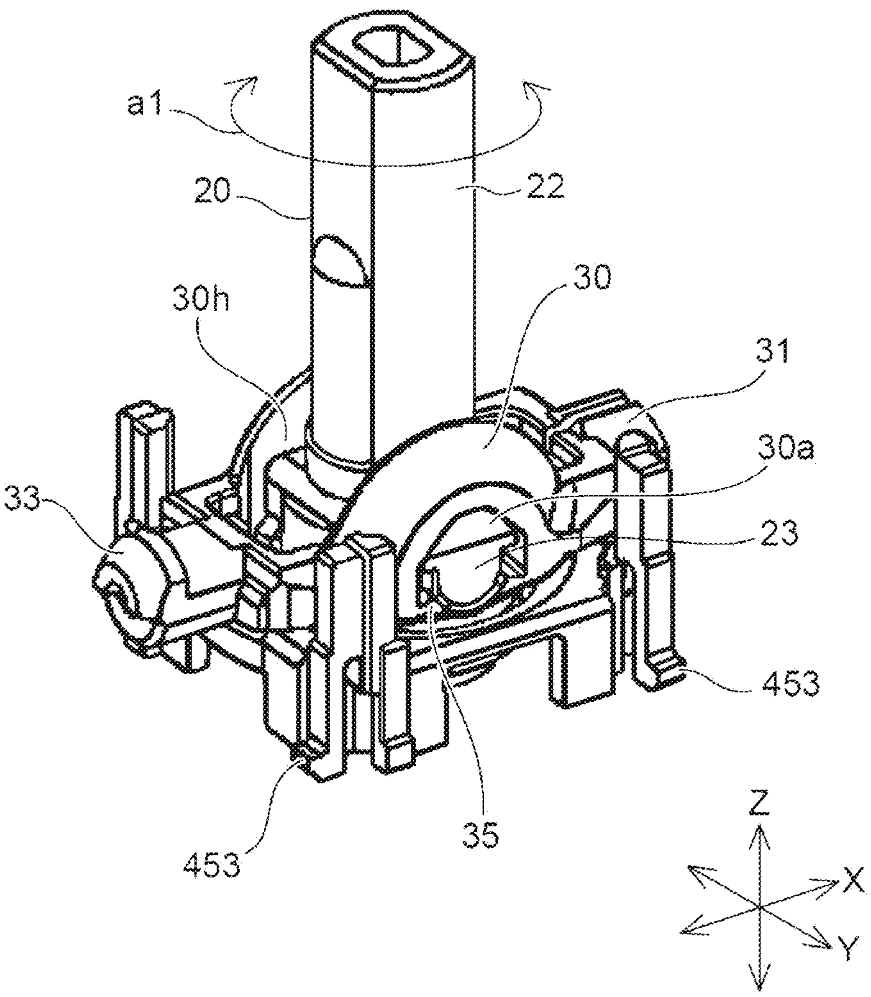
FIG. 6 is a perspective view illustrating an engagement relationship between a return member and a first interlock member.
Figure 7:
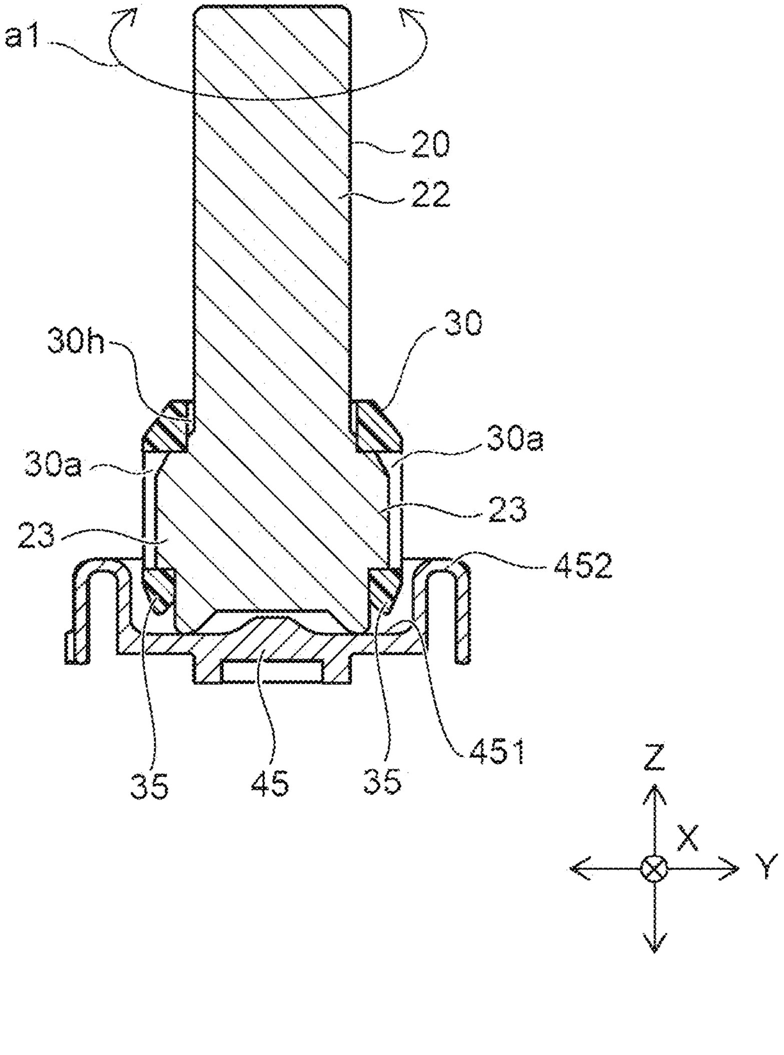
FIG. 7 is a cross-sectional view illustrating an engagement relationship between a return member and a first interlock member.

FIG. 6 is a perspective view illustrating an engagement relationship of the return member with the first interlock member. FIG. 7 is a cross-sectional view illustrating an engagement relationship of the return member with the first interlock member. FIG. 7 illustrates a cross-section (cross section on the YZ plane) viewed in the X direction in FIG. 6. The control member 20 is inserted through the center hole **30*h* of the first interlock member 30. The fit protruding portion 23 of the control member 20 slidably fits into the fitting hole 30*a* of the first interlock member 30 to enable the control member 20 to be tilted about the second turn axis AX2 with respect to the first interlock member 30. The first interlock member 30 is turnably supported about the first turn axis AX1 with respect to the housing 10. With this structure, when the control member 20 is tilted about the first turn axis AX1, the first interlock member 30 turns together with the control member 20** about the first turn axis AX1.

A part of the lower portion of the central portion of the first interlock member 30 is disposed inside the bottom portion 451 of the return member 45. In this embodiment, a lower portion 35 of the fitting hole **30*a* fitting with the fit protruding portion 23 of the control member 20 in the first interlock member 30 is disposed inside the bottom portion 451 of the return member 45. An upper surface of the bottom portion 451 is recessed from an outer peripheral side toward an inner peripheral side, and the lower portion 35 is located within the recessed portion of the bottom portion 451**.

With this structure, for example, when a torsional force about the axis of the control member 20 is applied (see the arrow a1 in the drawings), a force to come out of the fitting hole **30*a* is exerted on the fit protruding portion 23, causing the hole 30*h* of the first interlock member 30 to be expanded. In such a case, since the lower portion 35 of the fitting hole 30*a* is surrounded by the bottom portion 451, the movement of the lower portion 35 to go outside is regulated, suppressing the expansion of the hole 30*h*. Accordingly, even if a torsional force is applied to the control member 20, the fit protruding portion 23 can be prevented from coming out of the fitting hole 30*a***.

Engagement of Engaging Portions with Housing

Figure 8:
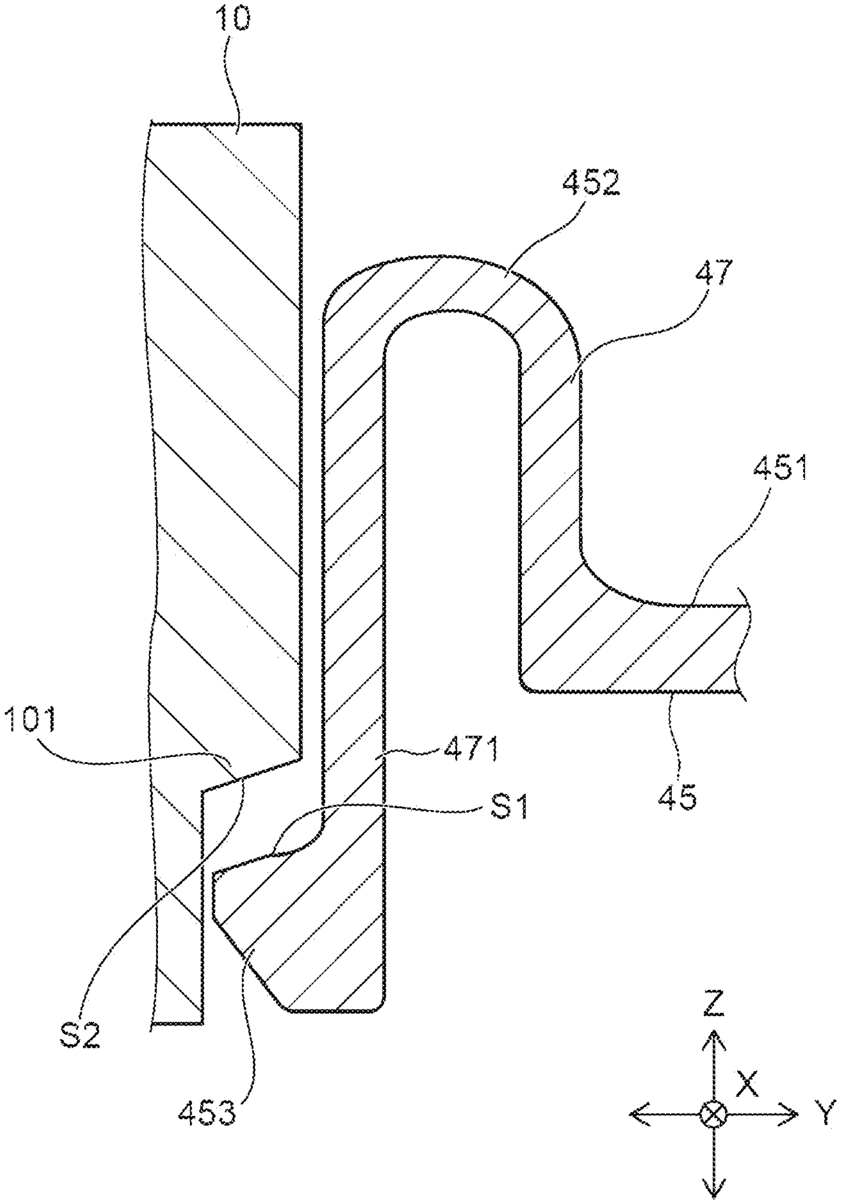
FIG. 8 is a schematic view illustrating engagement of an engaging portion with a housing.
Figure 9:
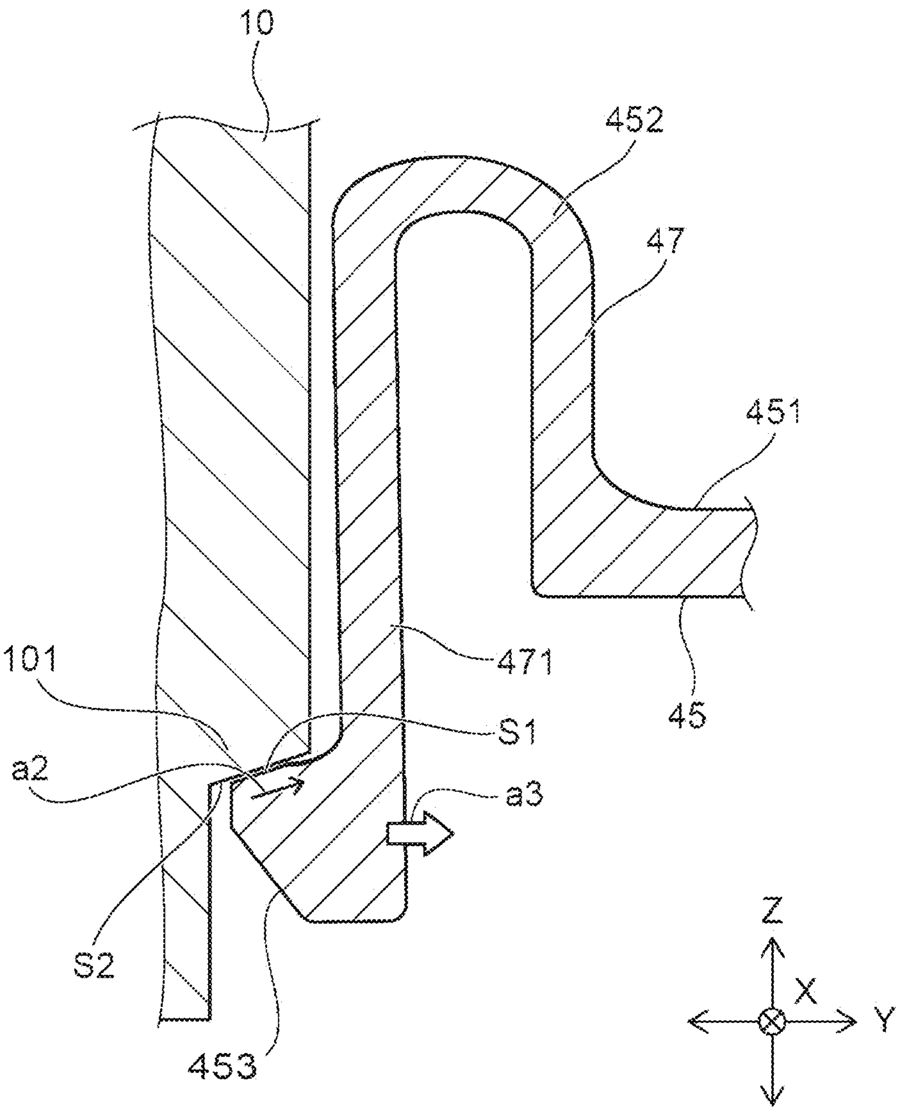
FIG. 9 is a schematic view illustrating engagement of an engaging portion with a housing.

FIG. 8 and FIG. 9 are schematic views illustrating engagement of the engaging portions with the housing. FIG. 8 illustrates a positional relationship between the engaging portion 453 and the housing 10 when the return member 45 is pushed downward (an enlarged schematic view of the area VIII in FIG. 4). As described above, the engaging portion 453 is provided on the outer peripheral side of the receiving portion 452 of the return member 45 and is configured to elastically engage the housing 10. The elastic deformation portion 47 that can be elastically deformed toward the inner peripheral side of the return member 45 is provided to the corner portion of the return member 45. The elastic deformation portion 47 has the piece member 471, which is, for example, formed in a substantially U shape, and the engaging portion 453 is provided to the outer peripheral side of the piece member 471.

The housing 10 has an engagement receiving portion 101 that engages the engaging portion 453. At least one of the engaging portion 453 and the engagement receiving portion 101 has a surface inclined with respect to the urging direction (Z direction) of the urging member 51. In this embodiment, both the engaging portion 453 and the engagement receiving portion 101 have an inclined surface S1 and an inclined surface S2 respectively. The inclined surfaces S1 and S2 have upward inclinations toward the inner peripheral side of the return member 45.

As illustrated in FIG. 8, in a state in which the return member 45 is pushed downward, the engaging portion 453 does not engage the engagement receiving portion 101, and no elastic deformation has occurred in the elastic deformation portion 47. Accordingly, when the return member 45 is pushed down and until the depressed return member 45 is moved upward and the engaging portion 453 engages the engagement receiving portion 101, no engagement-pushing force is applied between the engaging portion 453 and the engagement receiving portion 101, enabling the return member 45 to move in the up-down directions without large resistance.

FIG. 9 illustrates a positional relationship between the engaging portion 453 and the housing 10 when the return member 45 is pushed upward by the urging force of the urging member 51 (an enlarged schematic view of the area IX in FIG. 3). The return member 45 pushed upward causes the engaging portion 453 and the engagement receiving portion 101 to come into contact with each other and slide the engaging portion 453 along the inclined surface S2 (see the arrow a2 in the drawing), moving the engaging portion 453 toward the inner peripheral side of the return member 45 (see the arrow a3 in the drawing). With this structure, the piece member 471 of the elastic deformation portion 47 is bent and an engagement-pushing force is generated, thereby causing the engaging portion 453 to elastically engage the housing 10. Such elastic engagement of the engaging portion 453 with the housing 10 reduces the tilt return force applied to the return member 45, and the control member 20 can accurately return to the neutral position.

Here, when the control member 20 is off the neutral position and pushing the return member 45, the control member 20 is not pushing the center of the return member 45 and the bottom contact portion 251 of the control member 20 is pushing a portion off the center of the return member 45 corresponding to the tilt of the control member 20. Accordingly, with reference to the position (initial position) when the control member 20 is in the neutral position, the return member 45 not only moves downward when being pushed downward in the urging direction, but changes the position and is tilted with respect to the urging direction. As a result, the degree of compression of the urging member 51 varies.

From this state, when the pushing force of the control member 20 on the return member 45 is released, the variation in the degree of compression of the urging member 51 is directly applied to the elastic return force (urging force) of the urging member 51. Accordingly, not only the upward force in the urging direction, but also the tilt return force for returning the tilted return member 45 is added to the urging force. The tilt return force contributes to return the control member 20 to the neutral position; however, the direction and magnitude of the force vary depending on the position of the control member 20 when the pushing force on the return member 45 is released, and therefore, the return member 45 is prevented from returning accurately to the neutral position. In particular, when a tilting angle of the control member 20 is large and the degree of uneven compression of the urging member 51 via the return member 45 is large, the variation of the urging force of the urging member 51 is large. In such a case, the tilt return force becomes large and this force may cause the control member 20 to move to a position over the neutral position.

To prevent the occurrence of such a problem, it is preferable that this device have a structure to appropriately ease the effect of the tilt return force applied to the return member 45 when the force of the control member 20 to push the return member 45 is released.

In this regard, the multi-directional input device disclosed in Japanese Unexamined Patent Application Publication No. 11-053995 has a sliding structure including a holding wall of a lower frame and a return member. In this sliding structure, tilting of the return member with respect to the urging direction is regulated in the holding wall of the lower frame. More specifically, the multi-directional input device disclosed in Japanese Unexamined Patent Application Publication No. 11-053995 regulates the degree of tilt of the return member by using the sliding structure to prevent excessive tilt return force. However, in such a structure, as the tilting angle of the control member increases, the force for holding the tilt of the return member with the holding wall of the lower frame increases. Accordingly, strong local contact occurs inevitably between the holding wall of the lower frame and the return member. If the degree of this contact is excessively strong, the return member may be caught by the holding wall and the sliding structure may not be able to operate properly.

To solve the problem, in the control device 1 according to the embodiment, the return member 45 can be tilted to reduce the possibility of the occurrence of the above-described failure while enabling the engaging portions 453 to elastically engage the housing 10 when the urging member 51 applies a return force to the control member 20, without providing the sliding mechanism as in the multi-directional input device disclosed in Japanese Unexamined Patent Application Publication No. 11-053995. With this elastic engagement, part of the urging force of the urging member 51 is used for elastic deformation of the contact portion between the engaging portions 453 and the housing 10, and thereby the force transmitted from the urging member 51 to the return member 45 is attenuated. Accordingly, the tilt return force applied to the return member 45 can be reduced and the control member 20 can accurately return to the neutral position.

In addition, the elastic engagement of the engaging portion 453 with the housing 10 has a function of absorbing manufacturing variations in the control device 1. The control member 20 includes a plurality of movable members (for example, the control member 20, the return member 45, and the first interlock member 30), and thus there are inevitable variations in the manufacturing stage of each movable member and in the assembly stage of the movable members.

Due to the variations, in the control member 20, the positional relationships in the urging directions (up-down directions) between the engaging portions 453 and the corresponding engagement receiving portions 101 engaging the engaging portions 453 in the housing 10 slightly vary individually. Accordingly, by enabling elastic contact between the engaging portions 453 and the engagement receiving portions 101, the engaging portions 453 can engage the engagement receiving portions 101 in the urging directions (up-down directions) at more different positions. With this structure, the engagement of the engaging portions 453 with the engagement receiving portions 101 can be stabilized, and the individual engagement variations in the control device 1 can be reduced. In particular, in the control device 1 provided with four or more engaging portions 453, the engaging states of the engaging portions 453 with the engagement receiving portions 101 vary inevitably and such an engagement adjusting mechanism is particularly effective.

Figure 10:
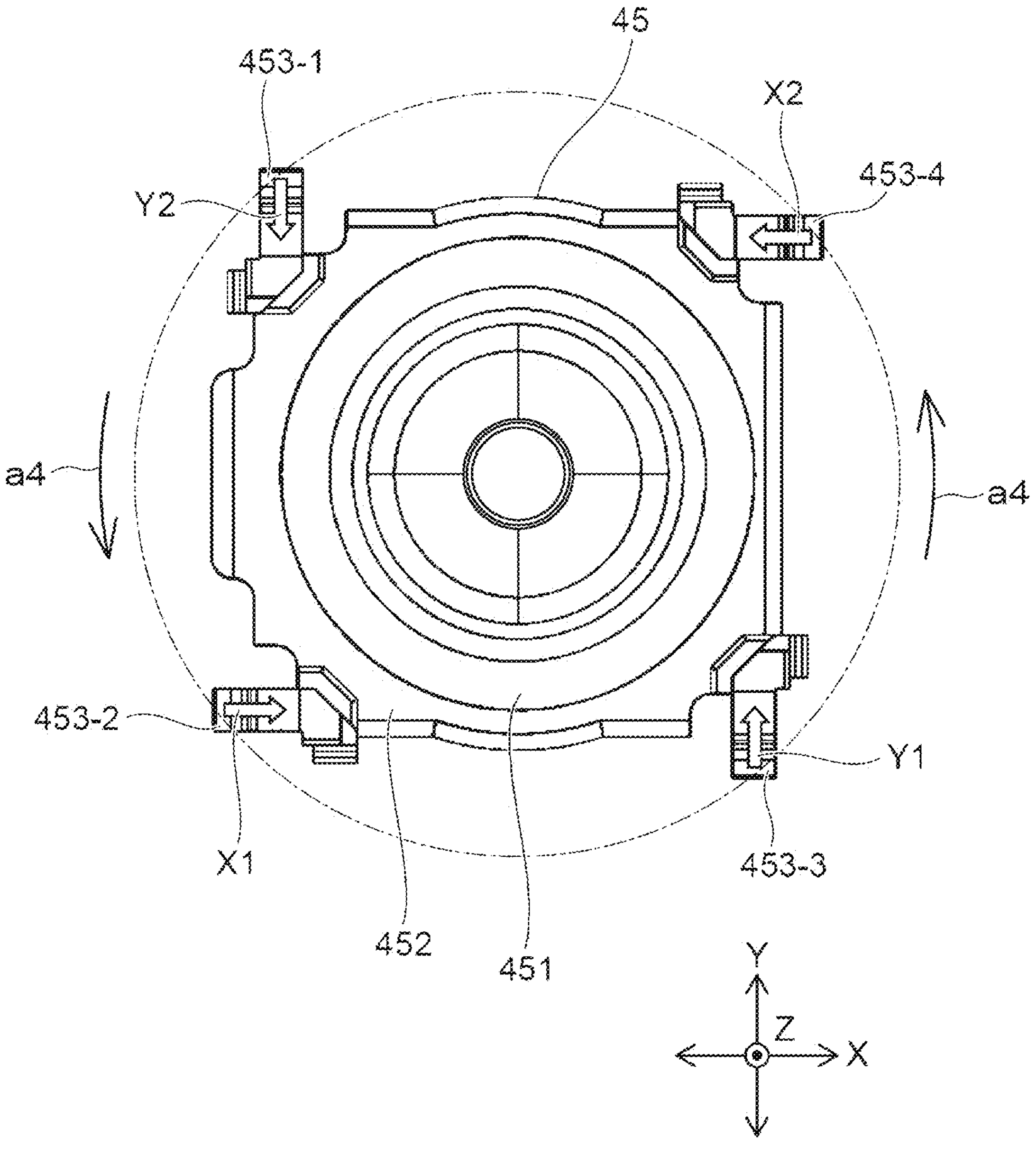
FIG. 10 is a plan view illustrating an example layout of a plurality of engaging portions.

FIG. 10 is a plan view illustrating an example layout of a plurality of engaging portions. When a plurality of engaging portions 453 are disposed on the outer peripheral side of the receiving portion 452 in the return member 45, it is preferable that a layout for reducing variations in engagement-pushing force due to the engaging portions 453 be employed. For example, when the control member 20 in the neutral position is viewed in the Z direction, a plurality of engaging portions 453 are provided on the same circumference (circle indicated by alternate long and short dashed lines in the drawing) about the center of the bottom portion 451, and when elastic engagement occurs, the engaging portions 453 move and the bottom portion 451 receives the force in one direction (see the arrow a4 in the drawing) along the circumference.

For example, when engaging portions 453-1 to 453-4 are provided to four corners of the return member 45 respectively, if the engaging portion 453-1 engages the housing 10, the engaging portion 453-1 moves in the direction indicated by the arrow Y2. When the engaging portion 453-3 provided at a position opposite to the engaging portion 453-1 engages the housing 10, the engaging portion 453-3 moves in the direction (direction opposite to the arrow Y2) indicated by the arrow Y1. When the engaging portion 453-2 provided at a position adjacent to the engaging portion 453-1 in the Y direction engages the housing 10, the engaging portion 453-2 moves in the direction indicated by the arrow X1. When the engaging portion 453-4 adjacent to the engaging portion 453-1 in the X direction (provided at a position opposite to the engaging portion 453-2) engages the housing 10, the engaging portion 453-4 moves in the direction (direction opposite to the arrow X1) indicated by the arrow X2.

More specifically, adjacent engaging portions 453 are configured to move in directions different by 90 degrees from each other, and an engagement-pushing force generated by the movement of the four engaging portions 453-1 to 453-4 as a whole cause the bottom portion 451 of the return member 45 to receive the force in one direction (in the example in FIG. 10, the counterclockwise direction) along the circumference. With this structure, variations in the engagement-pushing force due to the engaging portions 453-1 to 453-4 are gradually reduced and an offset of the bottom portion 451 in the in-plane direction can be suppressed. In other words, when an urging force is applied from the urging member 51 to the return member 45 that is pushed by the control member 20 that is tilted and inclined with respect to the urging direction, the urging force contains a force (tilt return force) to return the return member 45 to a position along the urging direction. This tilt return force causes variations in pushing forces (engagement-pushing forces) generated when each of the engaging portions 453 engages the housing 10. If the variations in the engagement-pushing forces of the engaging portions 453 cause an offset in the bottom portion 451 of the return member 45 in the in-plane direction, the neutral position of the control member 20 may move. This may result in a measurement error in the tilting operation in the control device 1. To solve the problem, the engagement-pushing forces generated in elastic engagement of the engaging portions 453 are directed to become a force (for example, a force in the direction indicated by the arrow a4 in FIG. 10) for turning the bottom portion 451 in the in-plane direction as a whole, thereby gradually reducing the variations in the engagement-pushing forces due to the engaging portions 453. The reduction in variation in the engagement-pushing forces suppresses an offset in the in-plane direction in the bottom portion 451 of the return member 45, and thereby the control member 20 can return accurately to the neutral position.

Figure 11:
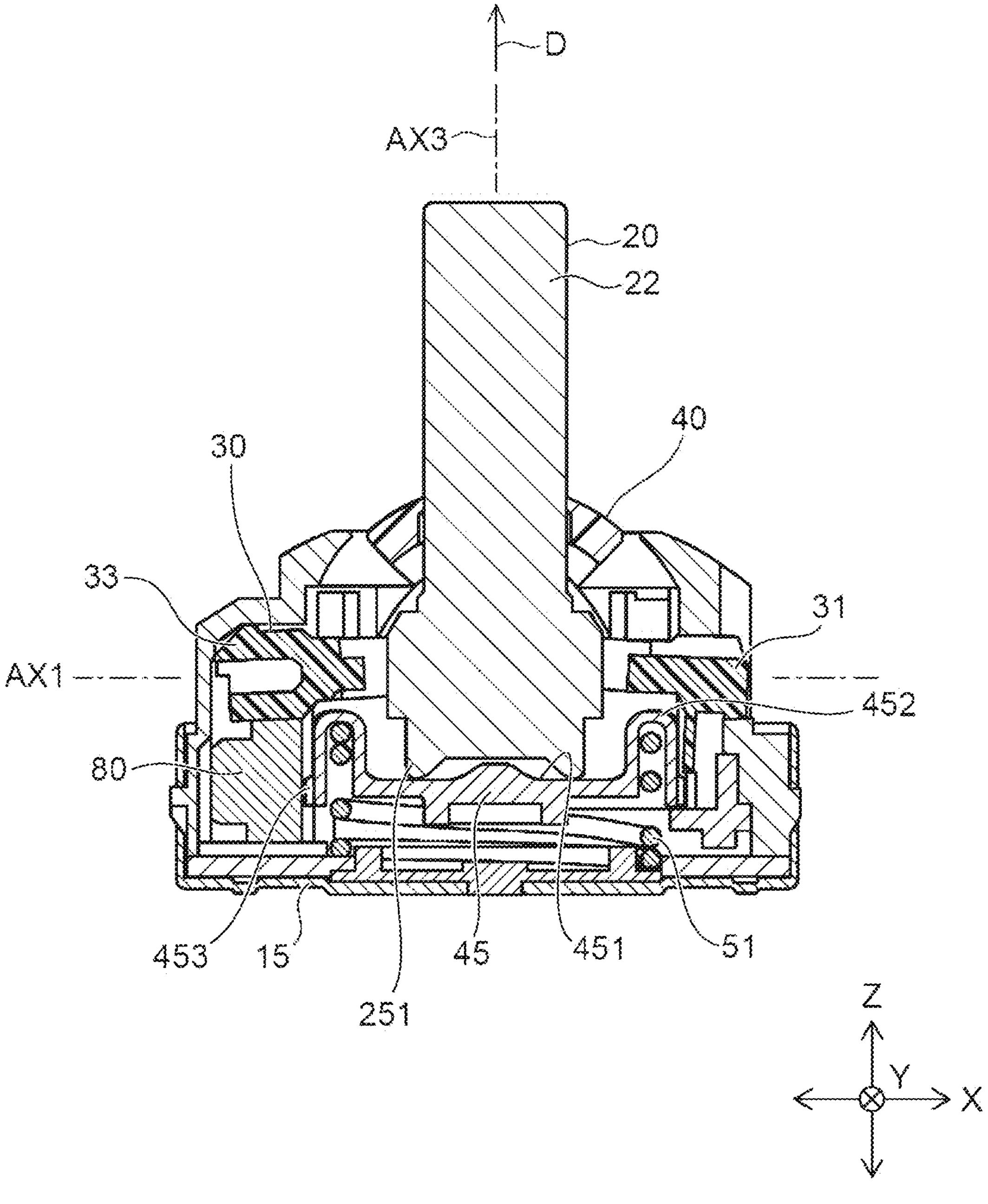
FIG. 11 is a cross-sectional view illustrating load absorption performed by a first interlock member.

FIG. 11 is a cross-sectional view illustrating load absorption performed by the first interlock member. In the control device 1 according to the embodiment, when the urging member 51 is compressed by tilting the control member 20 and the force being applied to keep the control member 20 tilted is released, an urging force to return to the state before the compression is generated. This urging force is first applied to the return member 45 and then transmitted to the control member 20 that is in contact with the bottom portion 451 of the return member 45. In the control device 1, the control member 20 and the first interlock member 30 are in contact with each other and the urging force is transmitted from the control member 20 to the first interlock member 30, and thereby the housing 10 is pushed in the first shaft support portion 31 of the first interlock member 30. In other words, in the control device 1, the first shaft support portion 31 serves as a stopper to stop the movement of the member due to the urging force. With this structure in which the first shaft support portion 31 is pushed by the housing 10 with urging force, play in the movement of the control member 20 and the first interlock member 30 can be suppressed from occurring.

Here, in the control device 1 according to the embodiment, as described above, the return member 45 includes the engaging portions 453, and the engaging portions 453 elastically engage the housing 10 to partially attenuate the urging force of the urging member 51. The degree of attenuation should be appropriately controlled. The urging force of the urging member 51 is partially attenuated also by the contact resistance at the contact area between the return member 45 and the control member 20 and the contact resistance at the contact area between the control member 20 and the first interlock member 30. Accordingly, to push the housing 10 appropriately by the first shaft support portion 31 of the first interlock member 30, the urging force must remain even if the urging force is subjected to the attenuation due to the above-described elastic engagement and frictional resistance. This can be expressed in the following equation.

Urging force of the urging member 51>attenuation due to elastic engagement of the engaging portions 453+frictional resistance of each component (1)

If the relational equation is not maintained, a return force for the control member 20 to return to the neutral position is not produced appropriately, and then the control member 20 cannot return to the neutral position. In particular, when the tilting angle of the control member 20 is small, the push-in depth of the return member 45 is shallow, and the urging force of the urging member 51 is small. Accordingly, when the urging force is attenuated due to the elastic engagement of the engaging portions 453, the above equation (1) may not be satisfied.

To solve the problem, the control device 1 according to the embodiment enables the first interlock member 30 to have some degree of elasticity when the first interlock member 30 comes into contact with the housing 10, without excessively increasing the degree of attenuation due to the elastic engagement of the engaging portions 453. With this structure, in response to an application of an urging force of the urging member 51 to the first interlock member 30 via the return member 45 and the control member 20, the first interlock member 30 is pushed toward the housing 10 side (upper side), while the first interlock member 30 is elastically deformed as illustrated in FIG. 11. It should be noted that in FIG. 11, the degree of deformation of the first interlock member 30 is emphasized.

When the first interlock member 30 is elastically deformed as described above, part of the urging force of the urging member 51 is accumulated as the elastic deformation. As a result, not only part of the urging force of the urging member 51 attenuates as elastic deformation in elastic engagement of the engaging portions 453 of the return member 45, but also part of the urging force scatters as elastic deformation of the first interlock member 30 and attenuates. In other words, it can be prevented that all urging force is applied to the return member 45 and thus the load exerted on the return member 45 can be reduced. With this structure, an increase in resistance load in elastic engagement of the engaging portions 453 with the housing 10 can be suppressed, and the force for the control member 20 to return to the neutral position can be ensured stably.

As described above, the control device 1 according to the embodiment enables stable sliding of the return member 45 and suppresses the occurrence of positional variations of the control member 20 in returning to the neutral position.

It should be noted that the return member 45 according to the embodiment is provided with the elastic deformation portions 47; however, elastic deformation portions (not illustrated) may be provided to the housing 10. In such a case, the engaging portions 453 can elastically engage the housing 10 similarly to the above-described embodiment. In addition, the elastic engagement of the engaging portions 453 with the housing 10 may be implemented by a structure other than the elastic deformation portions 47. For example, a member containing an elastic material may be provided at the engagement position of the engaging portion 453 with the housing 10.

Although the embodiment has been described above, the present invention is not limited to this embodiment. For example, the first turn detection section 60 and the second turn detection section 70 may be of a type other than the electrical-resistance type (for example, a magnetic type), and the displacement detection section 80 may be of a type other than the contact-sensing type (for example, an optical-sensing type or a capacity-sensing type). In the above-described embodiment, the control member 20 can be tilted about each of the first turn axis AX1 and the second turn axis AX2; however, the control member 20 may be tilted about only the first turn axis AX1 (or only about the second turn axis AX2). It is to be understood that any component may be added, any of the above-described components may be omitted, or any of the above-described designs may be modified, or any features of the structures according to the embodiment may be combined appropriately by a person skilled in the art without departing from the scope of the invention, and such modifications are included within the scope of the invention.

What is claimed is:

1. A control device comprising:
a housing having a plurality of engagement receiving portions at an inner peripheral side of the housing;
a control member partially housed in the housing, the control member including a shaft portion extending in a first direction, the control member being configured to be tilted to turn about a first turn axis intersecting the first direction;
a return member housed in the housing, the return member being configured to apply a return force to the control member in order to return the control member to a neutral position;
an urging member housed in the housing, the urging member being configured to apply the return force, along an urging direction, via the return member to the control member; and
a first turn detection section configured to detect a tilting operation of the control member, wherein
the return member includes:
a bottom portion in contact with an end portion of the control member in the first direction; and
a first receiving portion provided around the bottom portion, the first receiving portion receiving an end of the urging member, the first receiving portion having a plurality of engaging portions provided at an outer peripheral side of the first receiving portion, wherein a number of the plurality of engaging portions is three or more,
the urging member applies the return force to the control member while causing the plurality of engaging portions to elastically engage the housing, and
surfaces inclined with respect to the urging direction are formed at:
the plurality of engagement receiving portions;
the plurality of engaging portions; or
the plurality of engagement receiving portions and the plurality of engaging portions.

2. The control device according to claim 1, wherein
the housing has a first elastic deformation portion to cause the plurality of engaging portions to elastically engage the housing.

3. The control device according to claim 1, wherein
the return member has a second elastic deformation portion to cause the plurality of engaging portions to elastically engage the housing.

4. The control device according to claim 3, wherein
the second elastic deformation portion has a piece member extending along the urging direction,
the plurality of engaging portions are provided at an outer peripheral side of the piece member, and
when the plurality of engaging portions engage the plurality of engagement receiving portions of the housing, the plurality of engaging portions are bent toward an inner peripheral side of the return member.

5. The control device according to claim 4, wherein when the control member in the neutral position is viewed in the first direction, the plurality of engaging portions are provided on a circumference of a circle about a center of the bottom portion, and when the plurality of engaging portions are bent toward the inner peripheral side of the return member, the bottom portion receives a bending force, due to the bend of the plurality of engaging portions, in one direction along the circumference.

6. The control device according to claim 1, further comprising:

a first interlock member including a first shaft support portion supported by the housing turnably about the first turn axis, the first interlock member being configured to be turned in conjunction with the tilting operation on the control member, wherein the first turn detection section is configured to detect a turn of the first interlock member, the control member and the first interlock member are in contact with each other, and the first shaft support portion of the first interlock member is pushed against the housing by the urging force of the urging member transmitted from the control member to the first interlock member.

7. The control device according to claim 6, wherein the first interlock member is elastically bent by the urging force of the urging member.

8. The control device according to claim 1, further comprising:

another interlock member including another shaft support portion supported by the housing turnably about another turn axis intersecting the first turn axis, the another interlock member being configured to be turned in conjunction with the tilting operation on the control member; and another turn detection section configured to detect a turn of the another interlock member.

* * * * *